PERCENT LOSS IN CAPACITY

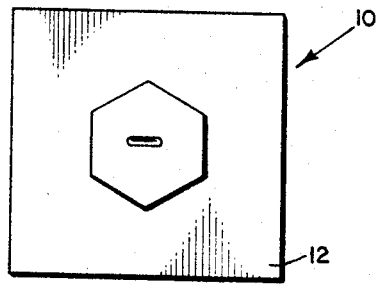
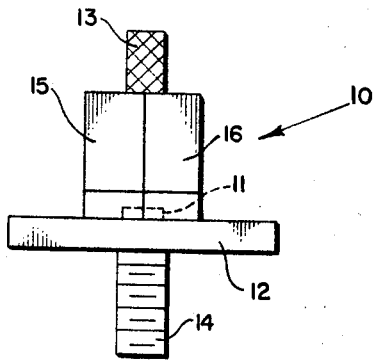
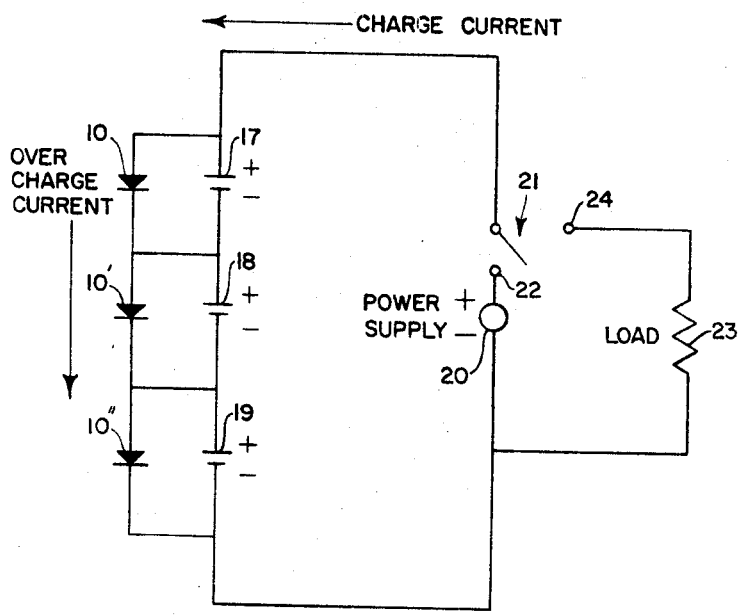
FIG. 1  FIG. 2
FIG. 3
INVENTORS
PETER J. WHORISKEY
FRANK J. COCCA
BY *Robert [signature]*
ATTORNEY THE AMPERE-VOLTAGE CHARACTERISTICS FOR A HEAT SINK & SEMICONDUCTOR MEANS DIODE COMPARED TO AN ORDINARY SEMICONDUCTOR OPERATED WITHOUT TEMPERATURE FEEDBACK

INVENTORS
PETER J. WHORISKEY
FRANK J. COCCA

BY
ATTORNEY

United States Patent Office 3,393,355
Patented July 16, 1968

3,393,355
SEMICONDUCTOR CHARGE CONTROL THROUGH THERMAL ISOLATION OF SEMICONDUCTOR AND CELL
Peter J. Whoriskey, Winchester, and Frank J. Cocca, East Boston, Mass., assignors to P. R. Mallory & Co. Inc., Indianapolis, Ind., a corporation of Delaware
Filed Aug. 9, 1965, Ser. No. 478,324
8 Claims. (Cl. 320—18)

ABSTRACT OF THE DISCLOSURE

A heat sink and semiconductor means connected across a battery cell to be charged wherein the heat sink has a thermal resistance which is such that the junction temperature of the semiconductor is such a function of the power dissipation of the semiconductor so as to maintain the junction voltage substantially constant and independent of current.

---

The present invention relates, generally, to rechargeable electric means, more particularly, to means and methods for rapid charging thereof without deleterious effects.

An efficient, simple, and effective means of preventing overcharging of a secondary cell has been sought for many years. It is known that recharging of the secondary cells may be accomplished by reconstituting the electrodes of the cell. However, a means of accurately terminating the recharging cycle of the secondary cell when the cell attains its full recharged state has eluded those skilled in the art.

During the initial phases of a recharge cycle of a secondary cell, it is known that substantially all the electrical energy is converted into chemical energy, thereby evolving no heat or an insignificant amount of heat that has substantially no harmful effect on the secondary cell. As the secondary cell is recharged, oxygen is evolved at one of the electrodes of the cell and thereafter chemically reduced at the other electrode of the cell. The aforementioned chemical reduction of the oxygen is continuous until such time as the secondary cell has its electrodes fully reconstituted. When the electrodes are reconstituted, the cell has attained its so-called "fully recharged state." Continued recharging of the secondary cell at rates in excess of the equilibrium charge rates has resulted in the creation of harmful conditions. It is known that a fully recharged secondary cell may not reduce the oxygen evolved at the same rate at which it is evolved. Therefore, if the overcharging period is continued at a rate in excess of the equilibrium charge rate, the electrodes of the secondary cell can be damaged and, if the cell is hermetically sealed, pressure substantially increases within the cell due to the accumulation of oxygen. Prolonged subjection to an overcharging period may rupture and/or explode the cell.

In addition to the oxygen accumulation causing a significant increase in the internal pressure of the cell, and the damage suffered by the electrodes, harmful heat is generated within the cell since the conversion of electrical energy to chemical energy has substantially terminated. It is seen that overrecharging not only increases the internal pressure contained within the cell but reduces the effectiveness of the electrodes and also evolves heat which causes the voltage of the cell to fall. On the other hand, if the voltage of the cell rises above a predetermined value, hydrogen gas is evolved which, it is thought will not recombine within the cell.

The maximum continuous overcharging current to which a secondary cell may be subjected for extended periods of time has been established by industry. Recharging at the aforementioned established rate establishes a so-called equilibrium condition whereby the rate of evolution of oxygen at one electrode of the cell is equal to the rate of reduction of the evolved oxygen at the other electrode of the cell. This charging level is referred to as the C/10 rate for nickel-cadmium cells, wherein C is normal capacity of the secondary cell. It is seen that for a 1.25 ah. nickel-cadmium cell, that C/10=0.125 ampere. Silver-cadmium cells have an equilibrium charging rate of approximately C/100 and other types of cells may have other equilibrium rates.

The acceptance of the so-called "cordless" appliance is becoming more widespread. The "cordless" appliance uses, as a source of electrical energy, a rechargeable electric battery. It has been found that the user of the battery cannot be expected to accurately terminate the charging cycle after a specified time to avoid overcharging the plurality of cells of the battery. Also, there is no simple method that can be utilized to ascertain the remaining charge left in the cells of a used battery, the C/10 rates of recharge is the maximum safe rate of equilibrium recharging accepted by industry to recharge a nickel-cadmium battery. As a general rule, the C/10 rate of recharge requires from 14 to 16 hours to reconstitute the electrodes of nickel-cadimum cells.

The means and method of the present invention allow each cell of the battery to be recharged at a much faster rate yet prevent the cell from being overcharged by shunting substantially all of the charging current around the cooperatively associated secondary cell at or immediately prior to the associated secondary cell attaining its fully recharged state. The means and methods of the present invention shunt substantially all the current produced by the charging source of electrical energy except for an equilibrium current which is allowed to "tricklecharge" a cell after the electrodes of the cell have been reconstituted. Each of the plurality of cells forming the battery is provided with its own means of the present invention so that each cell may be fully reconstituted independent of the initial state of charge of the other cells of the battery and so that slight electrochemical variations between the several cells may be taken into consideration. By using the means and methods of the present invention, recharging time durations in the order of 2 to 3 hours may be achieved as compared to the 14 to 16 hours required by several of the prior art devices.

The means and method of the present invention act as a voltage sensitive gate means to shunt the recharging current around the cell when the cell attains a predetermined recharge state. A specially designed heat sink is utilized to allow the semiconductor means of the present invention to take advantage of the semiconductor means negative temperature coefficient. By utilizing a heat sink of a specific design, the current-voltage is made to exhibit a thermally induced negative resistance region. Therefore, the heat sink is a calibrated heat dissipator. As a result, the combination of the heat sink and semiconductor means permits the diode to shunt a progressively larger share of the charging current around the cooperatively associated cell than would otherwise be possible when the cell voltage reaches a predetermined voltage.

Therefore, it is an object of the present invention to provide a heat sink and semiconductor means cooperatively associated with an electrical storage battery to prevent overcharging of the battery.

It is another object of the present invention to provide a heat sink and semiconductor means cooperatively associated with each of the plurality of cells of an electrical battery so as to effectively terminate the recharge of each cell when the individual cell attains a predetermined recharged condition.

Another object of the present invention is to provide a novel heat sink and semiconductor means cooperatively associated with a plurality of secondary electrical cells that acts as a voltage-sensitive gate means to shunt a charging current around the secondary electrical cells when the cells reach a predetermied recharged state.

Still another object of the present invention is to provide a heat sink and semiconductor means cooperatively associated with a rechargeable battery means which is of sturdy construction and so composed as to be a self-contained device that is characterized by its accuracy of operation.

Yet still another object of the present invention is to provide a heat sink and semiconductor means cooperatively associated with a rechargeable battery means that is efficient, inexpensive, simple, accurate and effective in operation.

A further object of the present invention is to provide a heat sink and semiconductor means used with a rechargeable battery means that makes use of the semiconductor's voltage temperature coefficient to allow the semiconductor means to more accurately control the recharging cycle of the rechargeable battery means.

Another object of the present invention is to provide a heat sink and semiconductor means used with a rechargeable electrical storage battery means having a plurality of serially connected cells wherein the semiconductor is thermally isolated from the cells of the battery means.

Yet another object of the present invention is to provide combination heat sink and semiconductor means cooperatively associated with a plurality of rechargeable electric cells wherein the recharge cycle of said cells may be accomplished within 2 to 3 hours.

A further object of the present invention is to provide a combination heat sink and semiconductor means wherein the semiconductor characteristics are enhanced by the use of the heat sink which provides a temperature feedback path to maintain a constant forward voltage drop over an operating current range.

The present invention, in another of its aspects, relates to novel features of the instrumentalities described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Also other objects will appear in the following description, appended claims, and appended drawings. The invention resides in the novel construction, combination, arrangement, and cooperation of elements as hereinafter described and more particularly as defined in the appended claims.

The appended drawings illustrate the present invention constructed to function for the practical application of the basic principles involved in the hereinafter described invention.

In the drawings:

FIGURE 1 is a top view of the heat sink and semiconductor means of the present invention.

FIGURE 2 is a side view of the heat sink and semiconductor means of the invention shown in FIGURE 1.

FIGURE 3 is an electrical schematic of the present invention cooperatively associated with cells of an electric storage battery.

Figure 4:
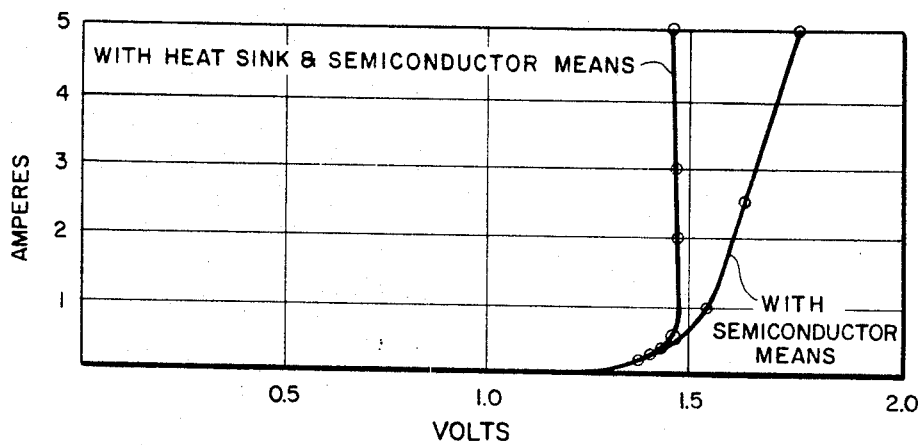
FIGURE 4 illustrates the current-voltage characteristic curve of the heat sink and semiconductor means with temperature feedback of the present invention compared to a semiconductor without temperature feedback.

Generally speaking, the means and methods of the present invention relates to an improved electrode regenerating device for rapid recharging of a single cell or a plurality of cells coupled in series. A heat sink and semiconductor means is coupled across the electrode terminals of a secondary cell in such a manner that the secondary cell is recharged rapidly without overcharge. If a plurality of series-coupled cells are to be recharged, a heat sink and semiconductor means is coupled across each of the plurality of cells.

More particularly, the present invention relates to a thermally isolated heat sink and diode means coupled so that heat feedback occurs. The heat feedback maintains a substantially constant forward voltage drop at a predetermined current value. The heat sink and diode means is coupled across the terminal electrodes of a cell to be recharged. The heat sink and diode means is substantially nonconductive when the voltage of the cell is below a predetermined voltage value and conductive when the cell is above the predetermined voltage value thereby recharging the secondary cell without overcharging thereof.

Referring now to the drawings, which illustrate an embodiment of the present invention, the heat sink and semiconductor means is generally indicated by numeral 10. A wafer 11 of suitable semiconductor material, such as silicon or germanium or the like, is disposed in the approximate center of heat sink 12 with a major surface thereof electrically connected to and securely held by the heat sink by any suitable bonding means such as solder or the like. The heat sink is fabricated from any suitable heat conductive metal such as anodized aluminum or the like. A braided copper shield wire 13 is attached to and extends from the other major surface of the wafer thereby forming a rectifying junction. The heat sink is tightly coupled to mounting head 14. The head may be fabricated from any suitable metal such as aluminum or the like and may be plated with a noble metal to substantially prevent corrosion.

A housing 15 includes a plurality of side walls 16 fixedly coupled at one end to the heat sink. The side walls are fabricated from any suitable metal such as copper or the like. The braided copper wire is suitably bonded and sealed to the side walls approximately equal distance from each side wall by any suitable electrically insulative material such as epoxy or the like. The epoxy serves to insulate the braided copper wire from the head and the side walls of the housing.

U.S. Patent No. 3,148,322, assigned to P. R. Mallory Co. Inc., the assignee of the present invention, shows the electrical schematic shown and illustrated in FIGURE 3. The voltage sensitive means described and illustrated in the aforementioned patent have had substituted therefor the novel heat sink and semiconductor means of the present invention.

Briefly, FIGURE 3 shows a plurality of series-coupled cells 17, 18 and 19 coupled in series to a suitable power supply 20. The power supply may be a direct current source. Coupled in shunt with cell 17 is a heat sink and semiconductor means 10. Likewise, a heat sink and semiconductor means 10' is coupled in shunt with cell 18 and a heat sink and semiconductor means 10'' is coupled in shunt with cell 19. A three position switch means 21 is coupled in series with the series connected cells so that the cells may be recharged when the switch is connected to terminal 22 or provide electrical current to activate load 23 when the switch is coupled to terminal 24. When the switch is coupled to terminal 23, charging current flows from the power supply in the direction of the arrow to the positive side of the secondary cells. When the cell voltage rises above a predetermined value, the heat sink and semiconductor means coupled across that cell becomes conductive and shunts the charging current around that cell preventing overcharge.

As shown in FIGURE 4, the diode used and described in the U.S. Patent No. 3,148,322 shows approximately zero current up to a specified terminal voltage of about 1.3 volts. Above this point the diode draws progressively larger amounts of current as the voltage increases. When the voltage value reaches that of the clamping voltage, in this case approximately 1.5 volts, the impedance of the diode can be seen to pass through zero and becomes negative.

As shown in FIGURE 4, when the cell with the particular heat sink and semiconductor means 10 reaches its predetermined fully recharged condition, the cell voltage triggers the cooperatively associated heat sink and semiconductor means to conduction, thereby providing a shunt path around the associated cell thus preventing overcharging of the cell. It is seen that the heat sink and semiconductor means draws only a slight amount of current until the cell reaches a charged condition at which point the heat sink and semiconductor means passes substantially immediately into a state wherein its dynamic impedance is substantially zero. It is seen that the heat sink and semiconductor means immediately above the breakdown voltage passes through a region of zero impedance and becomes negative as contrasted with the relatively higher dynamic impedance of the semiconductor without a heat sink.

As indicated hereinbefore, the heat sink is thermally isolated from the cell and provides a thermal feedback loop to the diode. The forward voltage drop of the means is significantly reduced through use of the heating effect. It is seen that the heat sink provides a temperature feedback path to maintain a constant forward voltage drop over the operating current range. The heating effect becomes important only after the cell voltage approaches the terminal voltage. No significant increase in leakage current at voltages lower than the breakdown voltage of the present invention is noted.

Figure 5:
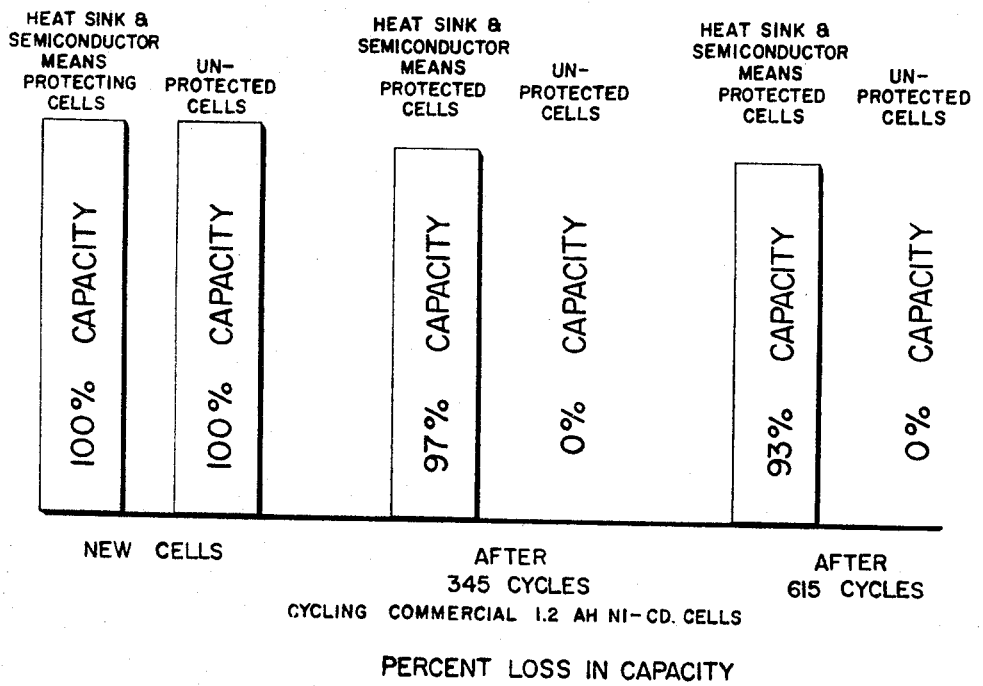
FIGURE 5 illustrates the typical percent loss in capacity of typical nickel-cadmium cells after cycling with and without the means and methods of the present invention.

FIGURE 5 illustrates that the present invention will substantially prolong cell cycle life. Cycle tests wherein a first plurality of 1.2 ah. nickel-cadmium cells recharged in accordance with the present invention were subjected to a 2-hour charge cycle and a 38 minute discharge at 0.5 ampere. A second plurality of 1.2 ah. nickel-cadmium cells were recharged using the 2-hour time cycle and a 38 minute discharge at 0.5 ampere but were not shunted by the means and method of the present invention. Results showed that the first plurality of nickel-cadmium cells recharged using the heat sink and semiconductor means exhibited a capacity loss of 3% after 345 cycles whereas the nickel-cadmium cells recharged without the heat sink and semiconductor means of the present invention showed a 100% loss in capacity after 345 cycles. After 615 cycles, the nickel-cadmium cells using the heat sink and semiconductor means showed a loss of about 7% whereas the unprotected cells showed a loss of 100%.

While the invention is described and illustrated with reference to a specific means and method, it will be understood that modifications and variations may be effected without departing from the scope of the novel concepts of this invention and as set forth in the appended claims.

Having thus described our invention, we claim:

1. In combination, a rechargeable cell and an electrode regeneration device connected in circiut together, said electrode regeneration device comprising heat sink and semiconductor means having at least two terminals and at least one junction mounted on said sink in heat exchange contact therewith, electrical conductors connecting said terminals of said heat sink and semiconductor means across said cell, said heat sink having thermal resistance which is such that the junction temperature of said semiconductor is such a function of the power dissipation of said semiconductor so as to maintain the junction voltage substantially constant and independent of current thereby bypassing currents above a specified rating around said cell.

2. In combination, a plurality of rechargeable cells connected in series and an electrode regeneration device connected in circuit together, said electrode regeneration device comprising a plurality of heat sink and semiconductor means, each of said heat sink and semiconductor means having at least two terminals and at least one junction mounted on said sink in heat exchange contact therewith, electrical conductors connecting said terminals of said heat sink and semiconductor means respectively across said cells, said heat sink having a thermal resistance which is such that the junction temperature of said semiconductor is such a function of the power dissipation of said semiconductor so as to maintain the junction voltage substantially constant and independent of current thereby bypassing currents above a specified rating around said cell.

3. In combination, a rechargeable battery cell and an electrode regeneration device connected in circuit together, said electrode regeneration device comprising heat sink and diode means having at least two terminals and at least one junction mounted on said sink in heat exchange contact therewith, electrical conductors connecting said terminals of said heat sink and diode means across said cell, said heat sink having a thermal resistance which is such that the junction temperature of said diode is such a function of the power dissipation of said diode so as to maintain the junction voltage substantially constant and independent of current thereby bypassing currents above a specified rating around said cell.

4. In combination, a plurality of rechargeable cells connected in series and an electrode regeneration device connected in circuit together, said electrode regeneration device comprising a plurality of heat sink and diode means, each of said heat sink and diode means having at least two terminals and at least one junction mounted on said sink in heat exchange contact therewith, electrical conductors connecting said terminals of said heat sink and diode means respectively across said cells, said heat sink having a thermal resistance which is such that the junction temperature of said diode is such a function of the power dissipation of said diode so as to maintain the junction voltage substantially constant and independent of current thereby bypassing currents above a specified rating around said cell.

5. In combination, a plurality of rechargeable cells connected in series and an electrode regeneration device connected in circuit together, said electrode regeneration device comprising a plurality of heat sink and diode means, each of said diode means having at least two terminals and at least one junction mounted on said sink in heat exchange contact therewith, electrical conductors connecting said terminals of said diode means respectively across said cells, said heat sink having a thermal resistance which is such that the junction temperature of said diode means is such a function of the power dissipation of said diode means so as to maintain the junction voltage substantially constant and independent of current thereby bypassing currents above a specified rating around said cell.

6. In combination, a plurality of rechargeable cells connected in series thereby forming a battery means and an electrode regeneration device connected in circuit together, said electrode regeneration device comprising a plurality of heat sink and diode means thermally isolated from said cells of said battery means, each of said diode means having at least two terminals and at least one junction mounted on said sink in heat exchange contact therewith, electrical conductors connecting said terminals of said diode means respectively across said cells, said heat sink having a thermal resistance which is such that the junction temperature of said diode means is such a function of the power dissipation of said diode means so as to maintain the junction voltage substantially constant and independent of current thereby bypassing currents above a specified rating around said cell.

7. In combination, a plurality of rechargeable cells connected in series thereby forming a battery means and an electrode regeneration device connected in circuit together, said electrode regeneration device comprising a plurality of anodized aluminum heat sink and diode means thermally isolated from said cells of said battery means, each of said diode means having at least two terminals and at least one junction mounted on said sink in heat exchange contact therewith, electrical conductors connecting said terminals of said diode means respectively across said cells, said heat sink having a thermal resistance which is such that the junction temperature of said diode means is such a function of the power dissipation of said diode means so as to maintain the junction voltage substantially constant and independent of current thereby bypassing currents above a specified rating around said cell.

8. In combination, a plurality of rechargeable battery cells connected in series thereby forming battery means and an electrode regeneration device and a switch means connected in circuit together, said electrode regeneration device comprising a plurality of anodized aluminum heat sink and diode means thermally isolated from said cells of said battery means, each of said diode means having at least two terminals and at least one junction mounted on said sink in heat exchange contact therewith, an electrical conductor connecting said terminals of said diode means respectively across said cells, said heat sink having a thermal resistance which is such that the junction temperature of said diode means is such a function of the power dissipation of said diode means so as to maintain the junction voltage substantially constant and independent of current thereby bypassing currents above a specified rating around said cell, said switch means for connecting said cells to said electrode regeneration device or a load.

References Cited

UNITED STATES PATENTS

| | | | |
|---|---|---|---|
| 2,827,597 | 3/1958 | Lidow | 317—234 |
| 2,471,011 | 5/1949 | Shapiro | 317—234 X |
| 2,624,033 | 12/1952 | Jacquier | 320—53 |
| 2,994,017 | 7/1961 | Kadelburg | 317—234 |
| 3,148,322 | 9/1964 | Booe et al. | 320—43 |
| 3,217,213 | 11/1965 | Slater | 317—234 |
| 3,265,805 | 8/1966 | Carlan et al. | 174—15 X |

OTHER REFERENCES

Motorola, Silicon Zener Diode and Rectifier Handbook, 1961, pp. 119–120.

LEE T. HIX, *Primary Examiner.*

WARREN E. RAY, *Examiner.*

S. WEINBERG, *Assistant Examiner.*